W. H. HIGGINS.
GROUND CLAMP.
APPLICATION FILED JUNE 17, 1913.
1,186,901.
Patented June 13, 1916.
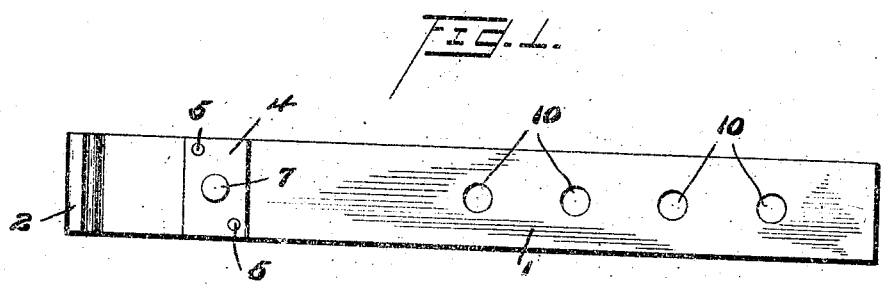
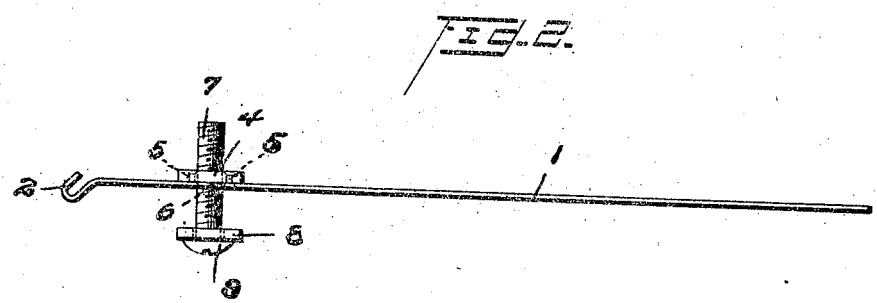
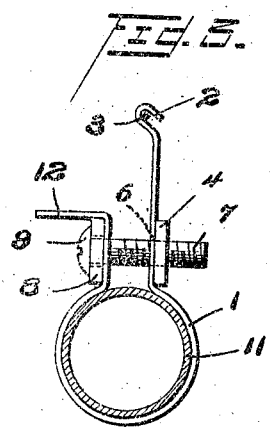
WITNESSES:
INVENTOR
William H. Higgins
BY
Joshua R. H. Potts
ATTORNEY

UNITED STATES PATENT OFFICE.

WILLIAM H. HIGGINS, OF PHILADELPHIA, PENNSYLVANIA.

GROUND-CLAMP.

1,186,901.

Specification of Letters Patent. Patented June 13, 1916.

Application filed June 17, 1913. Serial No. 774,139.

*To all whom it may concern:*

Be it known that I, WILLIAM H. HIGGINS, a citizen of the United States, residing at Philadelphia, in the county of Philadelphia and State of Pennsylvania, have invented certain new and useful Improvements in Ground-Clamps, of which the following is a specification.

My invention relates to improvements in ground clamps, and more particularly to an improved device which is adapted to be clamped around a pipe and operate as a grounding device for electric currents, the object of the invention being to provide a simple, inexpensive device of this character which will fit various sizes of pipes, and which will efficiently clamp upon any pipe around which it can be positioned.

A further object is to provide a device of this character which may be manufactured and sold at an extremely low price, and which is efficient in all respects for the purposes intended.

With these and other objects in view, the invention consists in certain novel features of construction and combinations and arrangements of parts as will be more fully hereinafter described and pointed out in the claim.

In the accompanying drawings: Figure 1 is a plan view illustrating my improved device. Fig. 2 is an edge view of Fig. 1, and Fig. 3 is a view in elevation illustrating my improved device in position on a pipe.

My improved ground clamp comprises a flat strip 1 which may be of copper or any other suitable metal. One end of this strip is provided with a hook 2 for the reception of an electric wire 3. A rectangular preferably oblong nut 4 is secured by rivets 5 to the strip 1 adjacent its hooked end 2, and said strip is provided with an opening 6 registering with the opening in the nut for the reception of a clamping bolt 7. On the bolt 7, an angular washer 8 conforming in shape to nut 4 is loosely positioned, and said bolt is provided with a screw-driver receiving head 9 as clearly shown. The strip 1, throughout a portion of its length, is provided with a plurality of holes 10 adapted to receive in any of them the bolt 7 in accordance with the diameter of the pipe 11 on which the ground clamp is secured.

In operation, the bolt 7 is removed from nut 4 and strip 1 is bent around the pipe 11. Bolt 7 is then projected through washer 8 and through the proper opening 10 in strip 1, and is screwed through nut 4.

As seen most clearly in Fig. 3, the washer 8 and the nut 4 are located in parallelism and both with their edges in proximity to the pipe 11, so that the clamping action of bolt 7 compels a uniform bending of the strip to securely clamp around the pipe without any twisting or torsional strain upon the strip. After the proper adjustment is had, one end of the strip may be bent back as shown at 12 and the device is ready for use in connection with any desired electric circuit.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A ground clamp comprising a strip of metal of the same width and thickness throughout its length and bent at one end forming a hook, said strip adapted to be bent between its ends around a pipe, a nut fixed to the strip on its outer side at a point removed from the hooked end, said nut of a width corresponding to the width of the strip, said strip having an opening therein registering with the screw-threaded opening in the nut, a second nut corresponding in shape to the shape of the fixed nut and located against the outer surface of the strip adjacent its other end, said strip having openings therein in line with the nuts, and a bolt having a head positioned against the last mentioned nut and projected through the openings in the strip and having threaded engagement with the first-mentioned nut, said nuts so located with relation to the strip as to bend the strip around the pipe, substantially as described.

In testimony whereof I have signed my name to this specification in the presence of two subscribing witnesses.

WILLIAM H. HIGGINS.

Witnesses:
M. E. DITTUS,
CHAS. E. POTTS.